United States Patent [19]

Fulkerson et al.

[11] 4,355,509

[45] Oct. 26, 1982

[54] SPLIT TORQUE TRANSMISSION CONTROL

[75] Inventors: Thomas R. Fulkerson, Watertown; Royal R. Hawkins, Bloomington, both of Minn.

[73] Assignee: Sundstrand Corporation, Rockford, Ill.

[21] Appl. No.: 108,871

[22] Filed: Dec. 31, 1979

[51] Int. Cl.³ ............................................. F15B 7/00
[52] U.S. Cl. ..................................... 60/449; 74/687; 180/307
[58] Field of Search ................. 60/395, 399, 449, 484, 60/431, DIG. 2; 74/645, 664, 861, 720, 687; 180/307

[56] References Cited

U.S. PATENT DOCUMENTS

| | | | |
|---|---|---|---|
| 3,442,153 | 5/1969 | Ross | 60/449 X |
| 3,664,128 | 5/1972 | Heyl | 74/720 X |
| 3,803,843 | 4/1974 | Nyman et al. | 60/449 X |
| 3,903,756 | 9/1975 | Hamma | 60/449 X |
| 3,914,938 | 10/1975 | Cornell et al. | 60/395 |
| 3,943,715 | 3/1976 | Miyad et al. | 60/449 X |
| 3,969,896 | 7/1976 | Louis | 60/449 X |
| 3,986,357 | 10/1976 | Hoffmann | 60/449 X |
| 4,019,404 | 4/1977 | Schavek | 74/687 |
| 4,075,841 | 2/1978 | Hamma et al. | 60/449 x |
| 4,147,075 | 4/1979 | Rasman et al. | 74/720 |
| 4,180,979 | 1/1980 | Cornell | 60/431 |
| 4,259,881 | 4/1981 | Meyerle | 74/687 |

FOREIGN PATENT DOCUMENTS 605386 11/1934 Fed. Rep. of Germany ........ 60/449

*Primary Examiner*—Gerald A. Michalsky
*Attorney, Agent, or Firm*—Ted E. Killingsworth; Michael B. McMurry; Harold A. Williamson

[57] ABSTRACT

For use on a vehicle having a split torque transmission, the split torque transmission including first and second throughputs and a summing junction connected to the first and second throughputs and having a transmission output dependent upon the first and second throughputs, each throughput having an input connected to an output of the engine of the vehicle, the system including a sensor adapted to sense the output of the engine, and a controller connected to the sensor and adapted to control the second throughput dependent upon the engine output, the second throughput being controlled from a negative value cancelling the first throughput to a positive value so that the transmission output is varied from idle to a predetermined value.

20 Claims, 3 Drawing Figures

SPLIT TORQUE TRANSMISSION CONTROL

BACKGROUND OF THE INVENTION

This invention relates to the control of a split torque transmission of a vehicle and, more specifically, to the control of the hydrostatic throughput of the split torque transmission from a value which cancels the mechanical throughput to a value which yields maximum transmission output.

Motorized vehicles simplistically comprise an engine for providing power functions to the vehicle, drive wheels for propelling the vehicle over the surface on which it travels, and a transmission for transmitting the engine power to the wheels to drive the wheels so that the wheels in turn can drive the vehicle. Through the history of motorized vehicles, these transmissions have taken a number of forms ranging from gears which are manually selectable to connect the engine output to the drive shaft of the wheels, to automatic transmissions which automatically switch the gears, to hydrostatic transmissions in which no gear changes are involved but instead in which a hydraulic pump and hydraulic motor are connected between the engine and the vehicle drive shaft.

With the advent of larger, heavier vehicles, such as graders and planers for levelling and preparing a road bed for surfacing, graders and trimmers for surfacing the prepared road beds, bulldozers, and the like, transmissions in some cases have become more exotic. For example, some vehicles are now provided with split torque transmissions where the output power from the engine is divided between two, or possibly more, transmission throughputs. One throughput may be a set of mechanical gears having an input from the engine output and an output connected to a first input of a mechanical summing junction and a second throughput which may be a hydrostatic transmission having an input also connected to the engine output and having an output connected to a second input of the mechanical summing junction. The output from the mechanical summing junction is then connected to the drive shaft of the vehicle for turning the wheels or tracks to propel the vehicle along the roadway. This hydrostatic transmission may take the form of a hydraulic pump driven by the output of the engine for supplying hydraulic fluid, at a flow rate dependent upon engine speed and the swash plate angle of the hydraulic pump, to a hydraulic motor having an output shaft connected to the second input of the mechanical summing junction. The present invention controls such a split torque transmission based upon engine speed.

SUMMARY OF THE INVENTION

A split torque transmission of a vehicle, the split torque transmission including first and second throughputs and a summing junction connected to the first and second throughputs and having a transmission output dependent upon the first and second throughputs, each throughput having an input connected to an output of the engine of the vehicle, is controlled by a system having a sensor for sensing the output of the engine and a controller connected to the sensor for controlling the second throughput dependent upon engine output, the second throughput being controlled from a negative value cancelling the first throughput to a positive value whereby the transmission output is varied from idle to a predetermined value.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
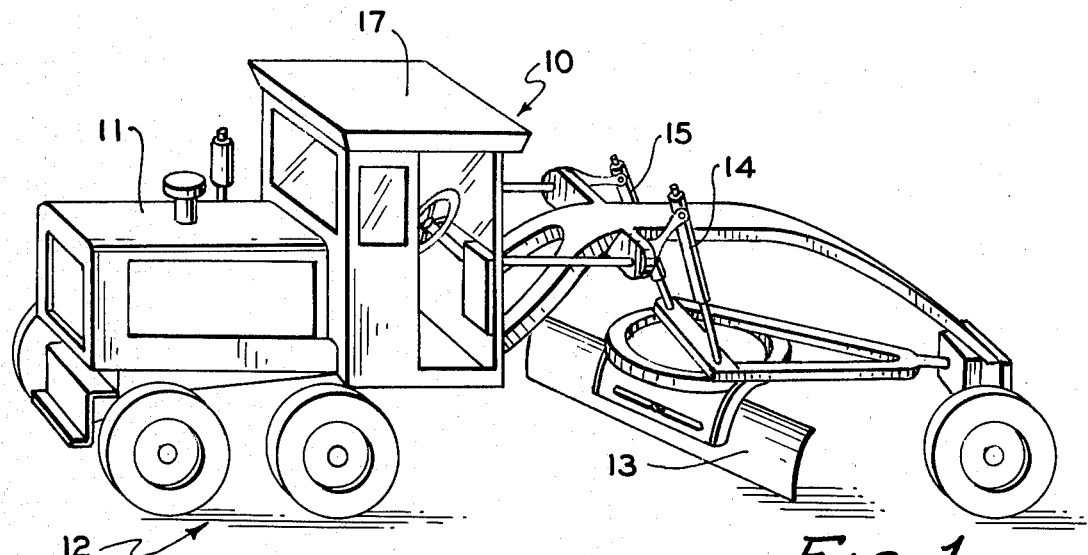
FIG. 1 shows the type of vehicle on which the present invention can be used.

Grader 10 shown in FIG. 1 is one type of vehicle which may have a split torque transmission and upon which the present invention can be used. Grader 10 includes an engine 11 for providing the power functions to the vehicle, drive wheels 12 for driving the vehicle along the roadway upon which vehicle 10 travels, and a working implement in the form of grader blade 13 for grading the roadway to a predetermined grade and slope as controlled by hydraulic rams 14 and 15. The split torque transmission for vehicle 10 can be seen in more detail in FIG. 2.

Figure 2:
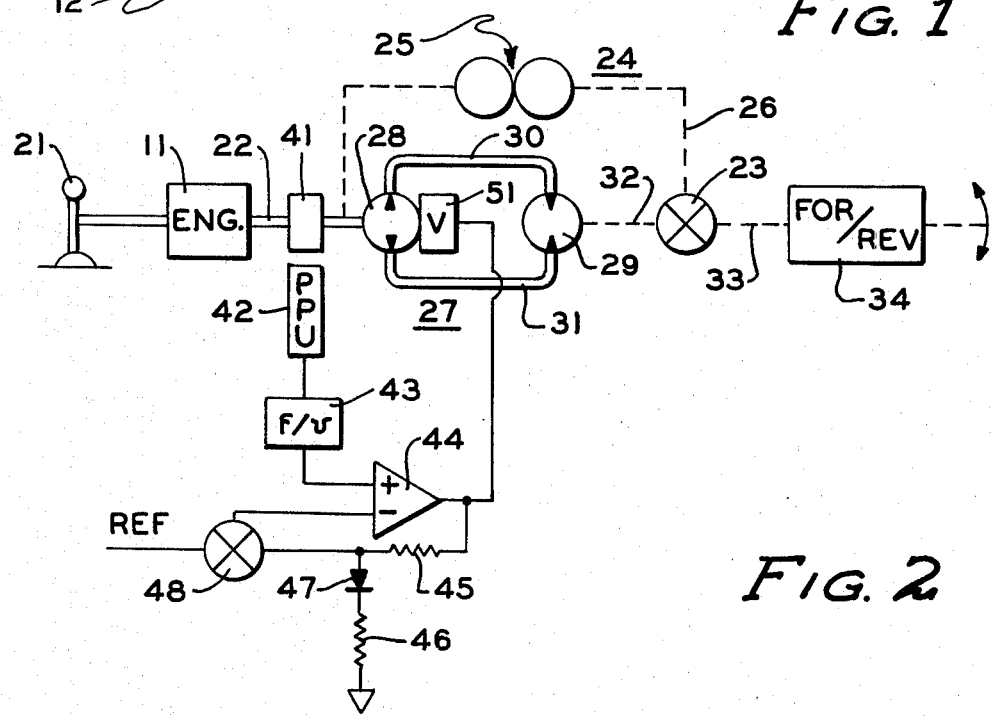
FIG. 2 shows the control system according to the present invention.

As seen in FIG. 2, throttle lever 21 which may be located within operator's cab 17 is mechanically connected to engine 11 for controlling the flow of fuel thereto for controlling the speed of output shaft 22 from engine 11 in terms of revolutions per minute. Shaft 22 is connected to mechanical summing junction 23 through mechanical throughput 24 and hydrostatic throughput 27. Mechanical throughput 24 may include a set of gears 25 which has an input connected to engine output 22 and an output connected to first input 26 of mechanical summing junction 23. Hydrostatic throughput 27 includes hydraulic pump 28 connected to engine output 22 and hydraulic motor 29 connected by hydraulic lines 30 and 31 to hydraulic pump 28. Hydraulic motor 29 has an output connected to second input 32 of mechanical summing junction 23. The output of mechanical summing junction 23 forms the transmission output 33 of the vehicle and may further be connected through a mechanical forward/reverse gearing 34 for controlling the direction of rotation for driving wheels 12. Thus, hydrostatic throughput 27 has an input connected to engine output 22 and an output connected to second input 32 of mechanical summing junction 23.

To control the flow of hydraulic fluid in lines 30 and 31 to drive hydraulic motor 29 and, therefore, second input 32 of mechanical summing junction 23, the control system according to the instant invention comprises disc 41 attached to engine output shaft 22 and adapted to rotate in a predetermined relationship with the shaft. Typically, disc 41 may have a plurality of teeth which interact with a magnetic field established by pulse pickup unit 42 to induce the pulses which are supplied to frequency-to-voltage converter 43. Pulse pickup unit 42 may be in the form of an SB100A pulse pickup manufactured by Honeywell Inc. This unit is adapted to provide an output signal having a frequency dependent upon the speed of rotation of engine output shaft 22. The output from pulse pickup unit 42 is connected to frequency-to-voltage converter 43 having an output connected to the positive input of amplifier 44. Frequency-to-voltage converter 43 is adapted to provide an output signal having a voltage dependent upon the frequency of the signal received from pulse pickup unit 42. Amplifier 44 has an output connected through resistor 45 to one input of summing junction 48, the other input of which receives a reference signal, and the output of which is connected to the negative input of amplifier 44. A modified function of summing junction 48 and resistor 45 is provided by diode 47 and resistor 46 connected to ground. Frequency-to-voltage converter 43 and amplifier 44 may be supplied as a package designated as a W883A speed control amplifier manufactured by Honeywell Inc.

The output from amplifier 44 is connected to servovalve 51 which may be a Honeywell V7058A-Hydrotransmission Valve. Servovalve 51 provides a hydraulic output based upon the signal received from amplifier 44, which output is used by pump 28 for controlling its swash plate angle and, therefore, the direction and proportional amount of fluid flow in lines 30 and 31 supplied to hydraulic motor 29.

Figure 3:
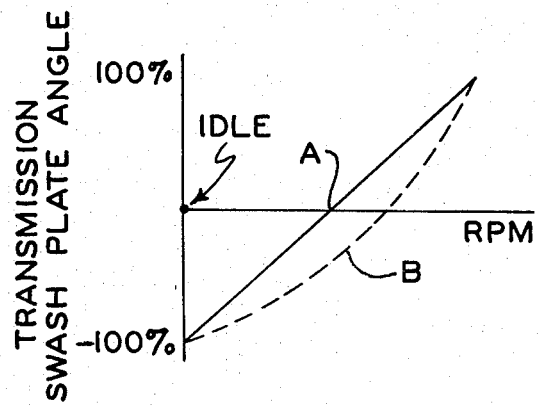
FIG. 3 is a graph showing hydrostatic transmission swash plate angle as a function of engine RPM in the system shown in FIG. 2.

As shown in FIG. 3, at some nominal engine output speed, the output from amplifier 44 is such as to control the swash plate angle of pump 28 so that the flow through hydraulic lines 30 and 31 drives hydraulic motor 29 in a manner to cancel the mechanical throughput as supplied to mechanical summing junction 23 by first input 26 so that transmission output 33 is idle, i.e. not rotating. As the rotational speed of engine output 22 increases, valve 51 will modulate the swash plate angle of hydraulic pump 28 from a negative 100% position to a positive 100% position so that the output of hydrostatic throughput 27 as connected to input 32 of summing junction 23 will have a decreasing negative impact upon first input 26 until output 33 reaches crossover point A at which point output 33 is driven only by second input 32. From crossover point, second input 32 will begin to add to first input 26. When the swash plate is controlled at positive 100%, transmission output 33 will be at its maximum. Dashed line B represents the response as determined by resistor 46 and diode 47. Specifically, resistor 46 and diode 47 are used to characterize the response curve of hydrostatic throughput 27.

At idle speed, the net transmission output is zero. At low engine speed, the very high reduction in the transmission allows small engine horsepower to develop high output torque. As the engine speed is increased, the transmission increases its throughput ratio until at some high engine speed, the throughput ratio is at a maximum. As the engine output speed reduces, whether from excessive loading or from a reduced throttle setting, the transmission throughput ratio changes and in effect changes to a lower gear. Thus, at low speed requirements, the engine need only run at low speed as high output torque is available at all engine speeds.

The embodiments of the invention in which an exclusive property or right is claimed are defined as follows:

1. A system for controlling a split torque transmission of a vehicle comprising, the split torque transmission including first and second throughputs and a summing junction connected to the first and second throughputs and having a transmission output dependent upon said first and second throughputs, each throughput having an input connected to an output of an engine of the vehicle, sensing means adapted to sense the output of said engine; and control means connected to said sensing means and adapted to control said second throughput solely dependent upon said engine output, said second throughput being controlled from a negative value cancelling said first throughput to a positive value so that said transmission output is varied from idle to a predetermined value.

2. The system of claim 1 wherein said sensing means comprises speed sensing means for sensing the speed of said engine output.

3. The system of claim 2 wherein said speed sensing means comprises a pulse pickup unit for providing an output signal having a frequency dependent upon said speed of said engine output.

4. The system of claim 3 wherein said control means comprises a frequency-to-voltage converter for receiving said output signal from said pulse pickup unit and for providing a converter output having a voltage dependent upon the frequency of the signal received from the pulse pickup unit.

5. The system of claim 4 wherein said control means further comprises an amplifier connected to said frequency-to-voltage converter and having an output connected to an output means for controlling said second throughput.

6. The system of claim 5 wherein said amplifier has a positive input connected to said frequency-to-voltage converter and a negative input connected to a reference means.

7. A system for controlling a split torque transmission of a vehicle, said split torque transmission including mechanical and hydrostatic throughputs and a summing junction connected to the mechanical and hydrostatic throughputs and having a transmission output based upon said mechanical and hydrostatic throughputs, each throughput having an input connected to an output of an engine of the vehicle, said hydrostatic throughput having a pump connected to the output of the engine for supplying hydraulic fluid to a hydraulic motor, sensing means adapted to sense the output of said engine; and control means connected to said sensing means and adapted to control the hydrostatic throughput solely dependent upon said engine output, said hydraulic throughput being controlled from a negative value cancelling said mechanical throughput to a positive value whereby said transmission output is varied from an idle to a predetermined level.

8. The system of claim 7 wherein said sensing means comprises speed sensing means for sensing the speed of said engine output.

9. The system of claim 8 wherein said speed sensing means comprises a pulse pickup unit for providing an output signal having a frequency dependent upon said speed of said engine output.

10. The system of claim 9 wherein said control means comprises a frequency-to-voltage converter for receiving said output signal from said pulse pickup unit and for providing a converter output having a voltage dependent upon the frequency of the signal received from the pulse pickup unit.

11. The system of claim 10 wherein said control means further comprises an amplifier connected to said frequency-to-voltage converter and having an output connected to an output means for controlling said hydrostatic throughput.

12. The system of claim 11 wherein said amplifier has a positive input connected to said frequency-to-voltage converter and a negative input connected to a reference means.

13. The system of claim 7 wherein said control means comprises a valve adapted to provide a hydraulic output to control the angle of a swash plate in said pump so as to control the flow of hydraulic fluid from said pump to said hydraulic motor for controlling said hydrostatic throughput.

14. The system of claim 13 wherein said sensing means comprises speed sensing means for sensing the speed of said engine output.

15. The system of claim 14 wherein said speed sensing means comprises a pulse pickup unit for providing an output signal having a frequency dependent upon said speed of said engine output.

16. The system of claim 15 wherein said control means comprises a frequency-to-voltage converter for receiving said output signal from said pulse pickup unit and for providing a converter output having a voltage dependent upon the frequency of the signal received from the pulse pickup unit.

17. The system of claim 16 wherein said control means further comprises an amplifier connected to said frequency-to-voltage converter and having an output connected to said valve for controlling said hydrostatic throughput.

18. The system of claim 17 wherein said amplifier has a positive input connected to said frequency-to-voltage converter and a negative input connected to a reference means.

19. A split torque transmission and control for a vehicle including an engine, said split torque transmission including a mechanical throughput driven by said engine, a hydrostatic throughput driven by said engine, a summing junction connected to both said mechanical and said hydrostatic throughput and providing a transmission output based upon said mechanical and hydrostatic throughputs, said hydrostatic throughput including a variable displacement pump driven by said engine and hydraulically connected to a hydraulic motor connected to said summing junction, the output of said variable displacement pump being controlled from a maximum negative value to a maximum positive value, speed sensing means connected to the output of said engine for sensing the speed thereof to provide a control signal, control means operated solely by said control signal and adapted to control the displacement of said variable displacement pump so that the output of said hydrostatic throughput is at said maximum negative value when said engine is at idle, said maximum negative value of said hydrostatic throughput being sufficient to cancel said mechanical throughput so that the transmission output of said summing junction is zero when said engine is at idle, said control means being operated by said control signal when said engine speed is increased from idle to increase the displacement of said hydrostatic throughput from said maximum negative value toward said maximum positive value to thereby increase the transmission output of said summing junction from zero.

20. The system of claim 19 wherein said speed sensing means provides a control signal having a frequency dependent upon the speed of said engine, and wherein said control means comprises a frequency-to-voltage converter for receiving said control signal to produce a voltage output dependent upon the frequency of said control signal, said voltage means further including an amplifier providing a nonlinear voltage output in response to an increase in said control signal provided by an increase in engine speed.

* * * * *